United States Patent [19]

Czapar

[11] Patent Number: 4,471,827
[45] Date of Patent: Sep. 18, 1984

[54] NON-PNEUMATIC INSERT TUBE FOR TIRES

[76] Inventor: William A. Czapar, 5578 Stetson Ct., Anaheim Hills, Calif. 92807

[21] Appl. No.: 509,743

[22] Filed: Jul. 1, 1983

Related U.S. Application Data

[63] Continuation-in-part of Ser. No. 455,653, Jan. 5, 1983, abandoned, which is a continuation-in-part of Ser. No. 414,068, Sep. 2, 1982, abandoned.

[51] Int. Cl.³ .............................................. B60C 7/00
[52] U.S. Cl. ................................. 152/320; 138/115; 152/400; 264/209.3; 428/36
[58] Field of Search ................. 152/157, 158, 310–312, 152/315, 318, 319, 320, 330 RF, 339, 342, 400, 301, 325, 329; 138/115, 119, 121; 428/36, 155; 264/209.3, 210.1; 16/45

[56] References Cited

U.S. PATENT DOCUMENTS

| | | | |
|---|---|---|---|
| 862,785 | 8/1907 | Andrew | 152/322 |
| 918,846 | 4/1909 | Gostlin et al. | 152/322 |
| 1,052,422 | 2/1913 | Miller | 152/319 |
| 1,390,467 | 9/1921 | Smith | 152/322 |
| 1,506,411 | 8/1924 | Cowgill | 152/320 |
| 1,819,632 | 8/1931 | Young | 152/322 |
| 1,825,502 | 9/1931 | De A Braga | 152/320 |
| 4,007,538 | 2/1977 | Petrie | 264/209.3 X |
| 4,275,782 | 6/1981 | McFarlane | 152/322 X |
| 4,371,023 | 2/1983 | Campagna | 152/158 |

*Primary Examiner*—William A. Powell
*Assistant Examiner*—Thomas Bokan
*Attorney, Agent, or Firm*—A. G. Douvas

[57] ABSTRACT

A non-pneumatic insert tube for a tire adapted to be mounted upon a circular rim. The insert tube is an elongated resilient plastic cylinder having a thin wall defining a continuous bore which extends throughout the entire tube length. A sequence of spaced partial cuts extends through the thin wall of the tube with the sequence of partial cuts being symmetrically centered about the outer periphery of the tube when formed into a single coil hoop for insertion into a tire and with an uncut portion of the tube being symmetrically centered about the inner periphery of the tube which is to be seated adjacent the rim. In certain species a reinforcing web, having a single web or a web of two or more intersecting cross legs, is disposed within and extends across the bore of the tube from sidewall to sidewall and is integrally joined to the opposite sidewalls. The single web and all cross legs are usually placed in tension in response to vertically applied loads. One or more cross legs are placed in tension in response to angularly applied forces which would otherwise tend to distort unacceptably the insert tube into a generally inclined elliptical cross section.

29 Claims, 23 Drawing Figures

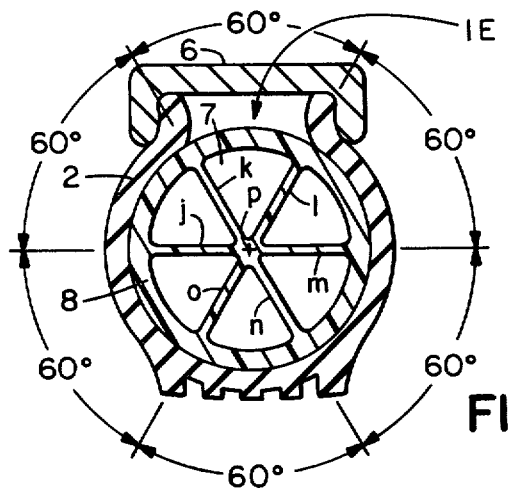
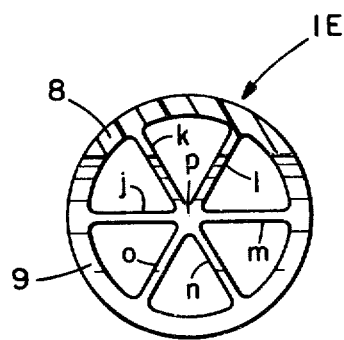
FIG.15  FIG.16
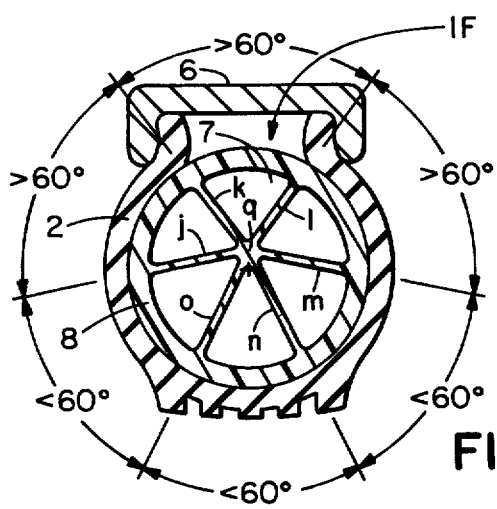
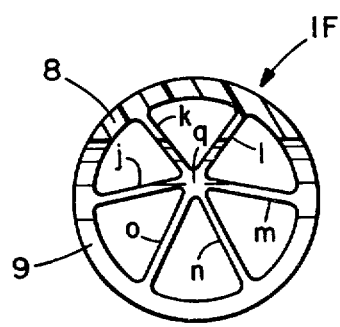
FIG.17  FIG.18
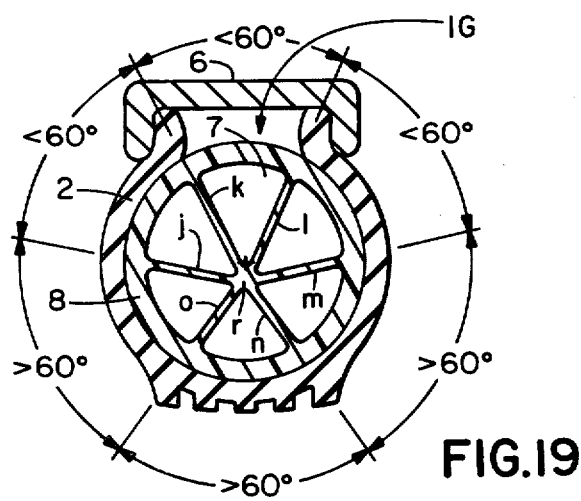
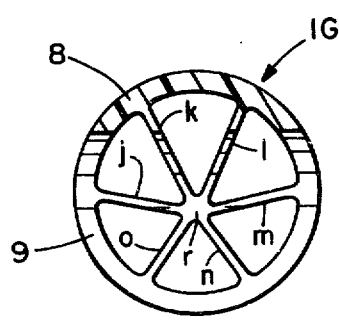
FIG.19  FIG.20

NON-PNEUMATIC INSERT TUBE FOR TIRES

BACKGROUND OF THE INVENTION

This is a continuation-in-part of U.S. patent application Ser. No. 06/455,653 filed Jan. 5, 1983, now abandoned which is in turn a continuation-in-part of U.S. patent application Ser. No. 06/414,068 filed Sept. 2, 1982, now abandoned.

This invention relates to a non-pneumatic insert tube adapted for use in a pneumatic tire as a replacement for pressurized air.

One of the major problems associated with pneumatic tires currently in use is that when the tire is punctured, the pressurized air contained therein will escape causing the tire to deflate. When this occurs, the tire has no practical utility until the puncture is sealed. This problem is well known to anyone who drives a vehicle and is a particular problem for those who operate bicycles having high-pressure pneumatic tires.

Many types of non-pneumatic tire inserts have been suggested as a solution for this problem. Examples of patents which disclose the use of tire inserts include the following: U.S. Pat. nos. 862,785; 918,846; 1,052,422; 1,390,467; 1,506,411; 1,819,632; and 4,275,782.

The inventor's abandoned U.S. patent application Ser. No. 06/414,068 filed Sept. 2, 1982 disclosed a non-pneumatic insert tube fabricated of extruded plastic with a series of spaced partial cuts in the insert tube all to enable the insert tube to be curved in a single coil without kinking. This low cost design is adequate for use in vehicles having tires which are not subjected to heavy weights or to intense, rapidly-applied forces. For example, the insert tube may be advantageously used in wheel chair applications which convey disabled individuals at a relatively low speed.

The inventor's abandoned U.S. patent application Ser. No. 06/455,653 filed Jan. 5, 1983, disclosed an improved non-pneumatic insert tube which features a single reinforcing web extending approximately across the horizontal diameter of the insert tube to prevent excessive flattening of the tube, particularly in response to tires subjected to moderately intense shock forces while carrying relatively heavier weights. For example, the non-pneumatic insert tube having the single reinforcing web is useful in more demanding wheel chair and bicycle applications.

Because of the advantages offered by non-pneumatic insert tubes, they have been considered for use in vehicles carrying still hevier loads while subject to both sudden impact forces and intense angularly applied forces. For example, an apparent demand exists for the use of non-pneumatic insert tubes in rickshas which may carry the full weight of several individuals. In this application, the insert tube diameter is relatively large. A soft ride of necessity dictates an insert tube having a relatively thin sidewall. With these design criteria, the insert tube, including of course the tire within which it is contained, may distort excessively into a generally inclined elliptical out-of-round shape during sharp cornering maneuvers at relatively high speeds.

The single flat reinforcing web first disclosed in the inventor's earlier abandoned application does not eliminate entirely the out-of-round elliptical distortion created by the foregoing aggravating and demanding conditions.

STATEMENT OF THE INVENTION

Accordingly, the principal object of this invention is to improve non-pneumatic insert tubes for tires so that such tubes may be advantageously used in applications and environments in which heavy loads are carried at relatively high speeds while subject to both angularly applied forces and also intermittent impact or shock forces.

Another object of this invention is to broaden the range of use of non-pneumatic insert tubes with respect to types of vehicles and loads with which they may be used.

A principal structural feature for attaining the foregoing objects relates to the inclusion of a reinforcing web structure within the bore of the insert tube having a single web or a plurality of generally intersecting cross legs to form the web. Three different species of reinforcing web structures are shown and described. The first species shows a single web. The second species is characterized by having two intersecting cross legs to form a generally X-shaped cross section, or a modified X-shaped cross section having a short horizontal center link. The third species employs three cross legs intersecting at the center, or above or below the center of the insert tube. The reinforcing web is located within the bore of the generally circular non-pneumatic insert tube and is integrally attached to the sidewalls of the insert tube at two, four or six points. When an insert tube is subjected to a vertically applied load, the reinforcing web is placed in tension with the result that excessive deformation or flattening of the insert tube is prevented. When the insert tube is subjected to angularly applied forces, in the main, one or more legs of the reinforcing web are placed in tension so as to prevent excessive distortion of the insert tube characterized by a generally inclined elliptical shape.

Certain variations of the invention contemplate the use of curved cross web segments so that the insert tube must be subject to a minimum threshold weight before one or both of the cross legs of the reinforcing web are placed in tension. This mode of operation provides a generally softer ride.

Additionally, another variation of the invention contemplates attachment points to the insert tube sidewalls to define a relatively larger span length. This design promotes the reinforcement strength of the insert tubes adjacent the wheel rim, particularly insert tubes having a relatively large diameter and a thin wall. This increased span length minimizes the tendency in this application for the insert tube to be distorted into an out-of-round, or generally inclined elliptical cross section adjacent the wheel rim in response to angularly applied forces.

The species having three intersecting cross legs to form a reinforcing web provides the greatest load handling capabilities of all the various designs shown. Another variation of the invention designed for light loads only eliminates the reinforcing web totally. In this embodiment, the insert tube is extruded continuously and partially cut through the cross-section at close intervals during extrusion.

BRIEF DESCRIPTION OF THE DRAWINGS

In order that all of the structural features for attaining the objects of this invention may be readily understood, detailed reference is made to the drawings wherein:

FIG. 15 is a section view of a first variation of the third species of the invention having three cross legs intersecting at the center of the insert tubes;

FIG. 16 is a section view showing the depth of the partial cut of the reinforcing web of FIG. 15;

FIG. 17 is a section view of a second variation of the third species of the invention in which the three cross legs intersect above the center of the insert tube;

FIG. 18 is a section view showing the depth of the partial cut of the reinforcing web of FIG. 17;

FIG. 19 is a section view of a third variation of the third species of the invention in which the three cross legs intersect below the center of the insert tube;

FIG. 20 is a section view showing the depth of the partial cut of the reinforcing web of FIG. 19;

DETAILED DESCRIPTION OF THE PREFERRED EMBODIMENT

Figure 1:
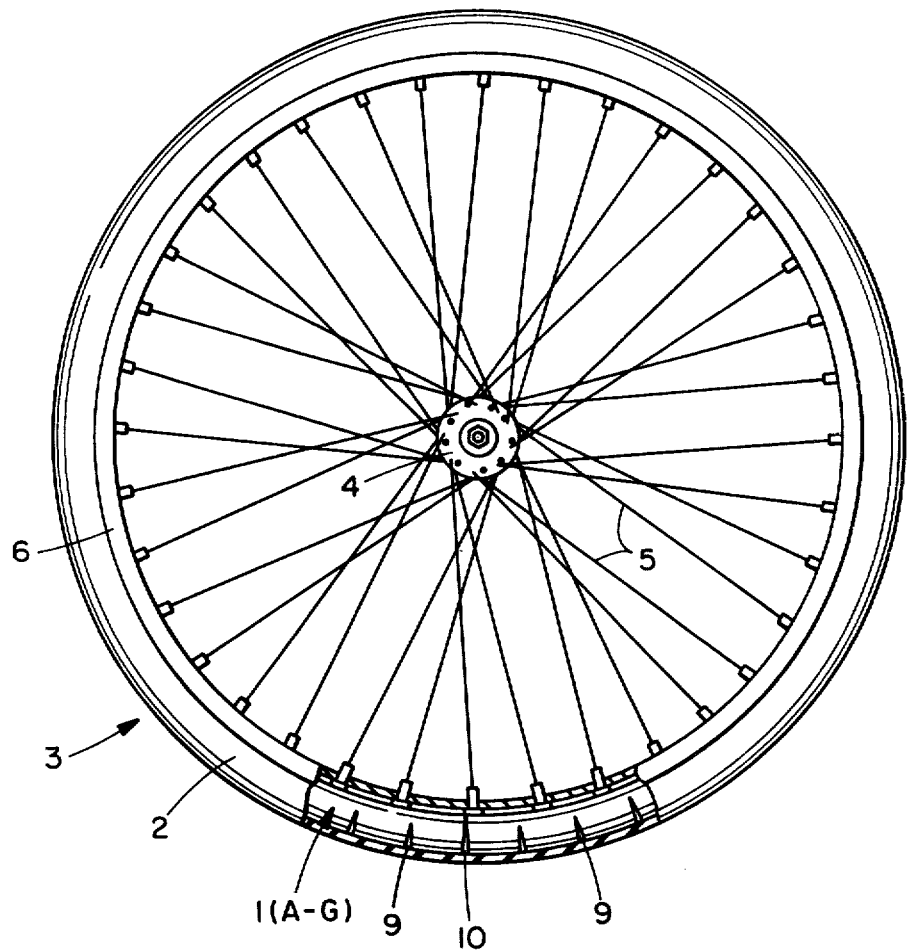
FIG. 1 is a side elevation view, partly in section, of a conventional wheel fitted with a tire employing a tire insert tube of this invention.
Figure 2:
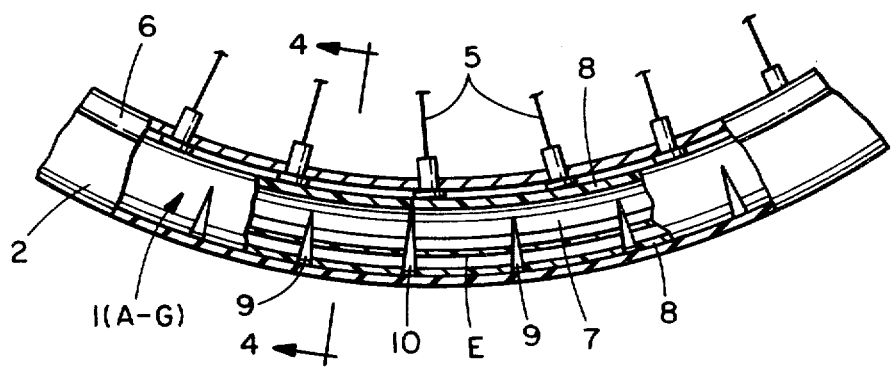
FIG. 2 is a fragmentary view of a portion of the wheel of FIG. 1 showing the tire and the tire insert tube partly in section.

Referring to FIGS. 1 and 2, tire insert tube 1 (A-G) of this invention is shown contained within conventional bicycle, motorcycle, or vehicle tire 2. Tire 2 is carried on wheel 3 which includes a hub 4 from which spokes 5 extend radially to rim 6. An appropriate length of insert tube 1 (A-G) is formed into a single coil (FIG. 3) for insertion into tire 2. Insert tube 1 (A-G) is fabricated from a resilient thermoplastic material.

Tire insert tube 1 (A-G) contains a central bore 7 defined for its entire length by cylindrical thin wall 8. This central bore functions as a cushioning chamber which is subdivided by the X and modified-X reinforcing webs disclosed in FIGS. 4, 6, 7 and 9 through 14 or which is subdivided by the three cross-leg reinforcing web construction shown in FIGS. 15 through 20. The reinforcing webs are particularly designed to strengthen insert tube 1 (A-G) in response to intense angularly applied forces on tire 2 (for example, during a turning maneuver on a sharp corner) or to prevent excessive flattening in response to heavy load weights.

Figure 3:
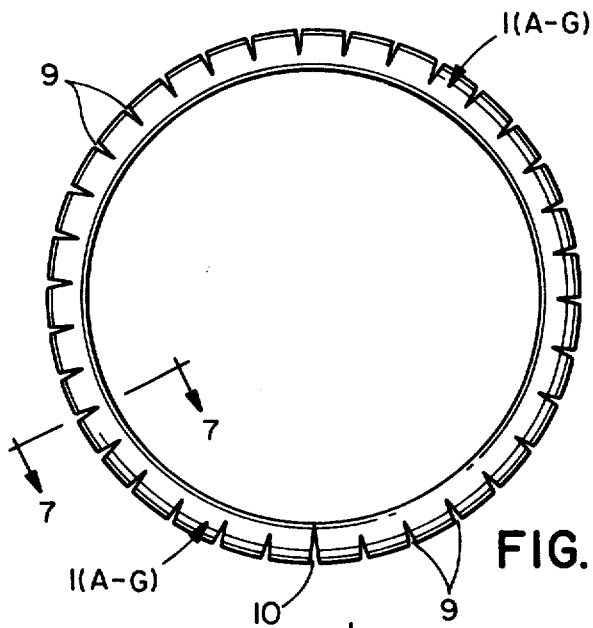
FIG. 3 is a side elevation view of a single coil of the tire insert tube removed from the tire.
Figure 4:
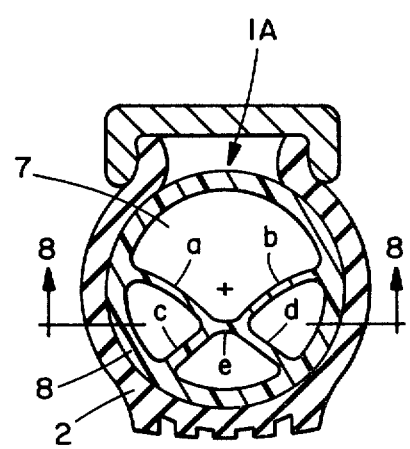
FIG. 4 is a section view of a first variation of the second species of the invention taken along line 4—4 of FIG. 2 and having a modified-X reinforcing web with a center link.

In a preferred mode of construction, insert tube 1 (A-G) is produced by continuous extrusion, and upon emerging from the extrusion die it is repeatedly cut at close intervals to form partial cuts 9 while the tube is emerging from the die and before the thermoplastic has fully set and completely cured. The cuts 9 (FIGS. 1, 2, 3, 7, 8, 16, 18, 20) are partial cuts through wall 8 to enable the insert tube to be curved into a single coil as shown in FIG. 3 without kinking. The ends of the single tube coil meet at 10 (FIGS. 1-3).

Figure 21:
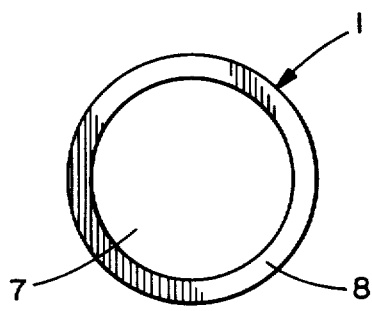
FIG. 21 is an end view of the simplest embodiment of the tire insert tube of this invention in which all reinforcing web structure is eliminated.
Figure 22:
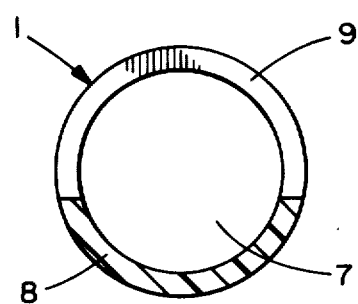
FIG. 22 is a view showing the depth of the partial cut of the embodiment of FIG. 21.
Figure 9:
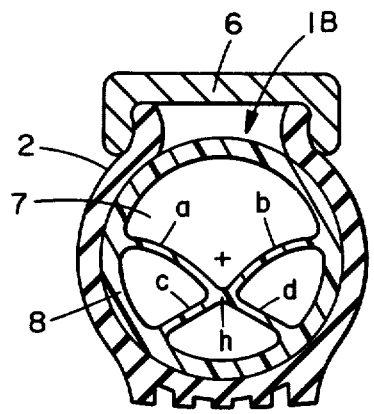
FIG. 9 is a section view of a second variation of the second species of the invention having an X-reinforcing web.

A tire insert tube with partial cuts 9 was originally the subject matter of the inventor's abandoned U.S. application Ser. No. 06/414,068 filed Sept. 2, 1982 (FIGS. 21 and 22 this application). The addition of a single reinforcing web extending approximately across the horizontal diameter of a tire insert tube was originally the subject matter of the inventor's U.S. application Ser. No. 06/455,653 filed Jan. 5, 1983 (FIGS. 5 and 5A this application).

The tire insert tube with partial cuts only (FIGS. 21 and 22) is satisfactory for vehicles carrying light loads and in which the tires are not subject to intense angularly applied forces. The inclusion of the single reinforcing web (FIGS. 5 and 5A) enables the vehicle to carry heavier loads with some improvement in the ability of the insert tube to withstand angularly applied loads. However, with the combination of a heavy load accompanied by repeated and intense, angularly-applied forces, the insert tube is subject to a partial collapse in the sense that the tire insert tube assumes an excessive out-of-round or a generally inclined-elliptical shape (FIG. 5). In some instances the tire insert tube loses its ability to return to its generally circular cross section.

Figure 5:
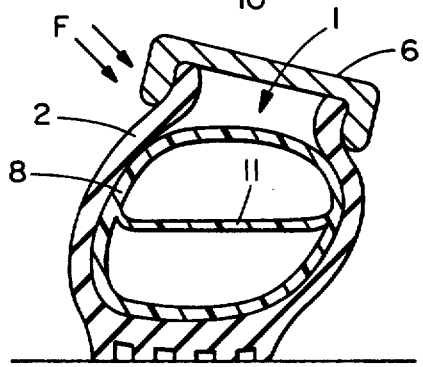
FIG. 5 is a section view showing the insert tube of the first species which has distorted into a generally inclined-elliptical shape in response to an excessive angular load.

In FIG. 5, angularly applied forces F are shown distorting tube 1 into an out-of-round or generally inclined elliptical shape. When properly loaded, tube 1 assumes the shape shown in FIG. 5A. Tube 1 has a single reinforcing web 11 of the design originally shown in the inventor's abandoned application Ser. No. 06/455,653. Insert tube wall 8 has partially collapsed due to the fact that forces F are strong enough to force the upper section of tube wall 8 above reinforcing web 11 excessively to the right, and the lower section of tube wall 8 below reinforcing web 11 excessively to the left. This phenomenon occurs most frequently when tube wall 8 is relatively thin and the cross-sectional diameter of the tube is relatively large with respect to the intensity of forces F. Reinforcing web 11 is placed in tension—and as such, restrains and supports the vertical sidewalls but is unable to prevent excessive side displacement of the generally semi-circular sections of tube wall 8 located both above and below reinforcing web 11. In order to provide a relatively cushioned ride, and yet prevent overstressing the sidewalls of tube 1 upon deformation, web 11 is preferably formed with a predetermined curvature or arch. This permits tube 1 to deform at a low load and provides a softer ride. However, when the load causes tube 1 to assume an elliptical shape (FIG. 5) due to excessive weight or severe impact, web 11 is placed in tension due to a flattening of the web arch.

Figure 5A:
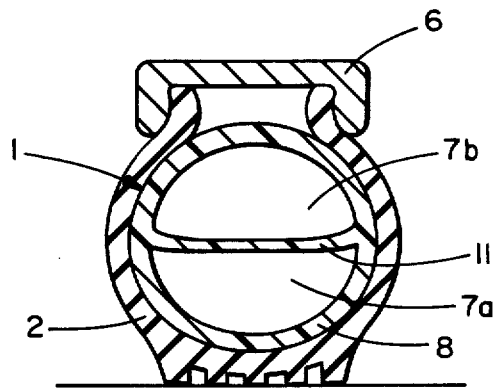
FIG. 5A is a view of the insert tube of FIG. 5 subjected to a light vertical load.

The novel insert tube designs of the second species of this invention substitute an X or modified-X reinforcing web having two intersecting cross legs for the single web 11 shown in FIGS. 5 and 5A. Four variations of the second species of reinforcing web structure are shown. In particular, in the variation of the second species (FIGS. 4 and 6), a modified-X reinforcing web is shown in which sidewall attached web segments a, b, c, d are joined together by center link e within insert tube 1A.

In the second variation of the second species (FIGS. 9 and 10) an X reinforcing web is shown in which sidewall attached web segments a, b, c, d are joined directly together without the inclusion of center link e within insert tube 1B.

In the third variation of the second species (FIGS. 11 and 12) a modified-X reinforcing web is shown in which sidewall attached segments a, b, c, d are joined together by a center link e within insert tube 1C. The reinforcing web of the third variation differs from that of the first and second variations in that the attachment points f and g of web segments a and b, respectively, are substantially elevated and occur closer to rim 6.

In the fourth variation of the second species (FIGS. 13 and 14) and X reinforcing web is shown in which sidewall attached web segments a, b, c, d are joined directly together within insert tube 1D and without the inclusion of center link e. The fourth variation is similar to the third variation in that the attachment points f and g of web segments a and b, respectively, are substantially elevated and occur closer to rim 6 than that of the first and second variations. The attachment span length between web segments a and c and also between b and d is relatively increased.

In response to a vertically applied load, both cross legs of the X or modified-X reinforcing web of all four variations of the second species are placed in tension. In particular with respect to variations 1 and 3, the cross leg comprising web segments a, e, d and the cross leg comprising web segments b, e, c are placed in tension; and with respect to variations 2 and 4, the cross leg comprising web segments a, d and the cross leg comprising web segments b, c are placed in tension.

Figure 11:
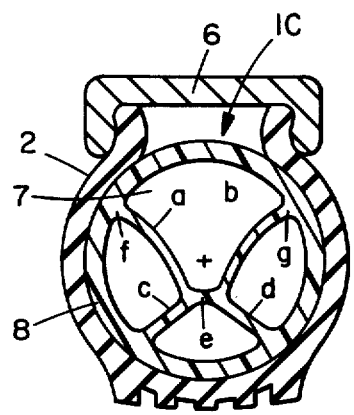
FIG. 11 is a section view of a third variation of the second species of the invention having an extended web attachment and employing a center link as part of a modified-X reinforcing web.
Figure 12:
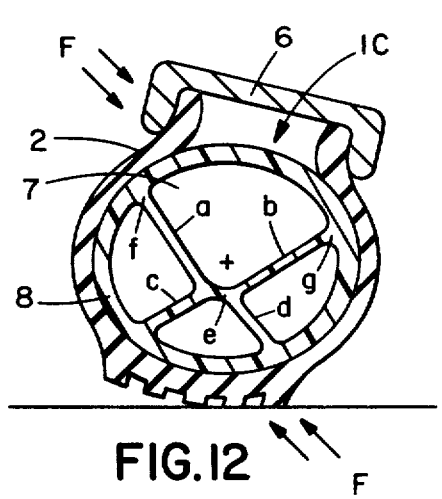
FIG. 12 is a section view which shows the structure of FIG. 11 responding to an angular side load.
Figure 13:
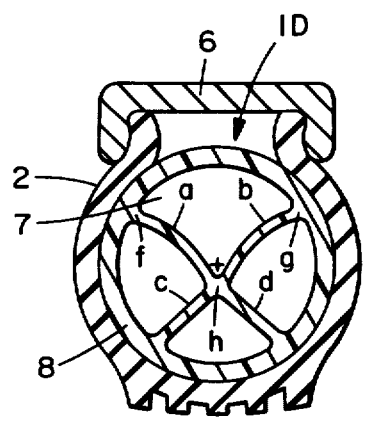
FIG. 13 is a section view of a fourth variation of the second species of the invention having an extended web attachment and having an X-reinforcing web.

With both cross legs in tension, the reinforcing web structure places a limit on the deformation or flattening of tire insert tube 1(A-D). The inclusion of center link e in the cross legs of the variation of FIGS. 4, 6 and the variation of FIGS. 11, 12 provides a somewhat softer ride when compared to that of the variation of FIGS. 9, 10 and the variation of FIGS. 13, 14 in which center link e has been eliminated. All other design criteria being the same, cross legs having center link e permit their associated tube wall to flatten to a greater extent than the cross legs omitting center link e before the reinforcing web is placed into tension.

Similarly, web segments a and b of all variations of the second species are shown formed with an optional slight curvature in the unloaded (no-tension) state shown in FIGS. 4, 9, 11 and 13. This curvature requires a relatively greater vertical load before the cross legs are placed in tension. As such, the curvature of web segments a and b provides a somewhat softer ride.

While web segments c and d are shown straight or flat for all variations of the second species, these web segments can also be formed with a slight curvature to provide a softer ride. In the main, however, an adequately soft ride can be attained by forming web segment a and b only with a curvature. Because excessive deformation tends to occur first in wall 8 defining the lower semi-circle containing the partial cuts 9, and secondarily, in the upper semi-circle adjacent rim 6, it is generally desirable to have web segments c and d go into tension before web segments a and b in response to vertically applied loads. The tensioned web segments c and d preferably reinforce the lower semi-circle of insert tube wall 8 first because partial cuts 9 project into the uper semi-circle of insert tube wall 8 to a limited extent only and also because the upper semi-circle is also reinforced by the channel sides of rim 6.

In general, center link e of variations 1 and 3 of the second species and the intersection point h of variations 2 and 4 of the second species are preferably located somewhat below the center of circular bore 7. This positioning facilitates placing the lower semi-circle of insert tube wall 8 into tension first.

Figure 6:
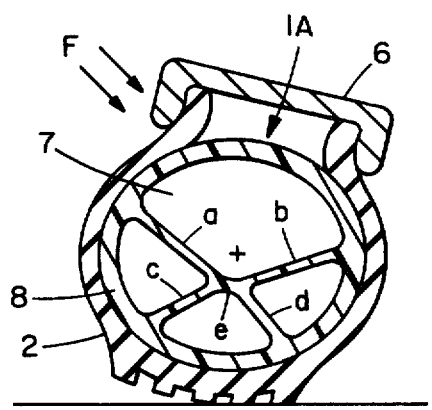
FIG. 6 is a section view showing the structure of FIG. 4 responding to an angular side load.
Figure 10:
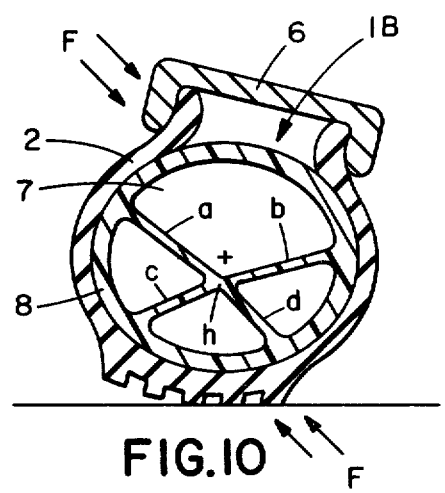
FIG. 10 is a section view which shows the structure of FIG. 9 responding to an angular side load.
Figure 14:
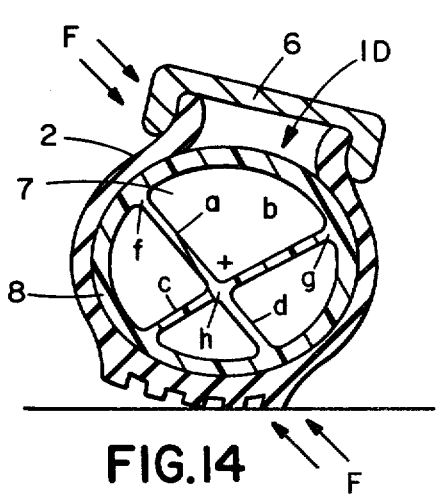
FIG. 14 is a section view which shows the structure of FIG. 13 responding to an angular side load.

When variations 1 through 4 of the second species, characterized by tire insert tube 1 (A-D), are subjected to angularly applied forces F as shown in FIGS. 6, 10, 12 and 14, cross webs b, c in FIGS. 10 and 14 and cross webs b, e, c in FIGS. 6 and 12 are placed in tension. In each case, the associated intersecting cross web a, d or a, e, d is not generally placed in tension. The tensioning of the single cross web, however, prevents insert tube wall 8 from going into a distorted inclined elliptical shape similar to that shown in FIG. 5 when insert tube 1 (A-D) is subjected to angularly applied forces.

In the event the angularly applied force is at a 90 degree angle to that of forces F, tire 2 will incline in the opposite direction, and the previously untensioned cross web will be placed into tension, namely a, d or c, e, d to prevent insert tube wall 8 from going into a distorted inclined elliptical shape.

While as previously noted, the primary tendency is for the lower semi-circle to distort before the upper semi-circle, in the case of insert tubes having relatively large diameters, the tendency for the upper semi-circle of tube adjacent rim 6 to distort can be reduced by elevating the web attachment points for web segments a and b to points f and g (FIGS. 11-14) which are relatively closer to rim 6 than the corresponding attachment points for web segments a and b of species 1 and 2 shown in FIGS. 4, 6, 9 and 10. The elevated attachment points f and g reinforce the upper semi-circle of the tire insert tube somewhat more than the lower attachment points.

Figure 7:
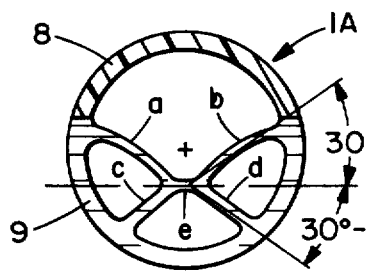
FIG. 7 is a section view taken along line 7—7 of FIG. 3 showing the depth of the partial cut.
Figure 8:
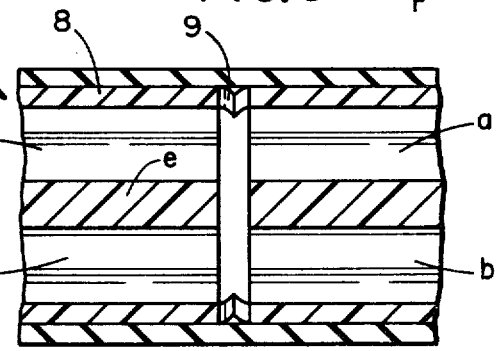
FIG. 8 is a section view taken along line 8—8 of FIG. 4.

In general, optimum design angles for web segments a, b, c, d relative a horizontal line passing through the point of intersection h of the cross webs (or segment e) are in the range of 30 to 45 degrees (FIG. 7).

The novel insert tube designs 1(E-G) of the third species of this invention substitute a reinforcing web having three intersecting cross legs for the single web 11 shown in FIGS. 5 and 5A, and for the two intersecting cross legs of insert tubes 1(A-D). In particular, insert tube 1E (FIGS. 15, 16) has a reinforcing web in which sidewall attached web segments j, k, l, m, n and o are joined together at intersection point p. Point p is located at the center point for the cylindrical tube wall 8. The attached web segments emanate radially from intersection point p to divide tube bore 7 into six equal pie-shaped sectors. Accordingly, each sidewall attached web segment forms a 60 degree angle with its adjacent segments.

As is shown in FIG. 16, partial cut 9 does not extend through the entire cross section for web segments k and l in a preferred design. This partial cut is to be distinguished from partial cut 9 shown in FIG. 7 applicable to insert tube 1(A-D). In insert tube 1(E-G) since the points of attachment of segments k and l are substantially elevated and closer to the inner periphery of tube wall 8 than the attachment for web segments a and b in insert tubes 1(A-D), it is desirable that the uncut portion of tube wall 8 be left relatively large so as to not unduly weaken sidewall 8 in the rim 6 area. This dictates that part of webs k and l, as shown in FIG. 16, preferably not be cut.

Because sidewall attached web segments j, k, l, m, n and o define 60 degree sectors from point p, insert tube 1E is substantially stronger than insert tubes 1(A-D). In response to heavy vertical loads, each of the three cross legs comprising j, m; k, n; and l, o is placed into tension. This web reinforcing arrangement enables insert tube 1E to resist deformation better than the designs 1(A-D). This improved resistance to deformation is not without some loss in the softness of the ride. Insert tube 1E provides a somewhat firmer and harder ride than the designs of insert tube 1(A-D). However, this compromise of softness for increased web reinforcing strength is necessary in those extremely rigorous applications in which the insert tube is used on relatively large vehicles carrying heavy weights. Similarly, insert tube 1E is also better able to withstand angularly applied forces.

Insert tube 1F represents a variation in the structure of insert tube 1E. In particular, intersection point q is elevated above the geometrical center point for the circular cylinder defined by insert tube wall 8. Elevating the intersection point, as at q, but maintaining the web attachment points for segments j and m on the horizontal diameter, enlarges the sector angles defined by segments j, k, l and m for the inner or upper semi-circle adjacent the rim to greater than 60 degrees. This weakens the resistance to deformation of the rim half of insert tube 8; however, the sector angles defined by segments m, n, o and j for the lower or ground half of insert tube 1F are made less than 60 degrees. This strengthens the resistance to deformation of the ground half of insert tube 1F. Insert tube 1F is advantageously employed in those applications in which greater strength is required of the lower half of the insert tube adjacent the ground, while less strength, due to reinforcement by rim 9, is required of the upper half.

As is shown in FIG. 18, partial cut 9 employed in insert tube 1F does not extend through the entire cross section for cross sections k and l for reasons similar to those discussed with respect to FIG. 16 as they applied to insert tube 1E.

Insert tube 1G shown in FIGS. 19 and 20 displays another variation in the reinforcing web of the third species. In this variation, cross-leg intersection point r is located below the geometrical center for insert tube wall 8. With this disposition of intersection point r the inner or upper sector angles defined by web segments j, k, l and m are less than 60 degrees, whereas the lower sectors defined by segments m, n, o and j are greater than 60 degrees. With this disposition of intersection point r, the upper half of insert tube 1G is strengthened at the expense of the lower half. This latter variation is desirable in those applications which require that the lower half of insert tube 8 be relatively stronger than the upper half.

In FIG. 20 the depth of partial cut 9 through segments k and l of insert tube 1G is similar to that previously shown and discussed with respect to FIGS. 16 and 18.

FIGS. 21 and 22 show the simplest form of the invention in which all reinforcing web structure is eliminated. As is shown in FIG. 22 insert tube wall 8 is fabricated with a series of partial cuts 9.

In all of the variations, the spacing of successive partial cuts 9 is preferably less than the outer diameter of insert tube wall 8. Satisfactory performance has been obtained with a spacing approximately equal to the radius of the circle defined by wall 8.

It should be understood that the above described typical embodiments are merely illustrative of the principles of this invention. Modifications can be made without departing from the scope of the invention.

What is claimed is:

1. A non-pneumatic insert tube for a tire comprising an elongated tube having a thin wall defining a bore of substantially uniform cross-section which extends throughout the length of the tube, a sequence of longitudinally spaced partial cuts through the thin wall of the tube with each partial cut being generally transverse to the longitudinal axis of the uncoiled tube and with the sequence of partial cuts being disposed about the radial outer periphery of the tube when formed into a single coil hoop for insertion into a tire and with an uncut portion of the tube being located on the radial inner periphery of the coiled tube, and a reinforcing web having two or more intersecting cross legs disposed within the bore of the tube to extend from sidewall to sidewall for the length of the tube and removed from the inner and outer radial peripheries of the coiled tube and integrally joined to the interior wall of the tube, and each cross leg having a generally uniform thickness throughout the length of the tube less than the thickness of the thin wall of the tube with each cross leg being severed at least in part by the partial cuts.

2. The combination of claim 1 in which at least two of the cross legs of the reinforcing web are disposed in an X-shaped, cross-sectional configuration.

3. The combination of claim 1 in which at least two of the cross legs of the reinforcing web are disposed in a modified X-configuration including a center link.

4. The combination of claim 1 in which each cross leg is formed with a pair of wall attached segments joined together at the locus of the intersection of the cross legs.

5. The combination of claim 4 in which the locus of intersection is offset from the insert tube center toward the outer periphery of the insert tube.

6. The combination of claim 4 in which the locus of intersection is offset from the insert tube center toward the inner periphery of the insert tube.

7. The combination of claim 4 in which the locus of intersection is located approximately on the geometrical center of the undeformed tube bore.

8. The combination of claim 4 in which at least one of the attached segments of each of the cross legs is formed with a cross-sectional curvature in the untensioned state for the entire length of the tube.

9. A non-pneumatic insert tube for a tire adapted to be mounted upon a circular rim comprising an elongated tube having a thin wall defining a continuous bore of substantially uniform cross-section which extends throughout the entire tube length, a sequence of longitudinally spaced partial cuts severing the thin wall of the tube with each partial cut being generally transverse to the longitudinal axis of the uncoiled tube and with the sequence of partial cuts being generally symmetrically centered about the radial outer periphery of the tube when formed into a single coil hoop for insertion into a tire and with an uncut portion of the tube being generally symmetrically centered about the radial inner periphery of the tube which is to be seated adjacent the rim, and a reinforcing web having a plurality of relatively thin intersecting cross legs extending across the bore of the tube from sidewall to sidewall for the length of the tube and integrally joined to the interior wall of the tube adjacent the partial cuts with the sequence of partial cuts also severing the reinforcing web at least in part.

10. The combination of claim 9 having three cross legs in which two of the three cross legs comprise at least two web segments attached to the interior wall of the tube with the attachment of the one segment being located closer to the inner periphery of the insert tube and with the attachment of the other segment being located closer to the outer periphery of the insert tube.

11. The combination of claim 10 in which the third crossleg divides the tube bore into two approximately equal semicircles both of which are generally symmetrically disposed about both the inner and outer periphery of the insert tube.

12. The combination of claim 9 in which the cross-sectional locus of intersection of the cross legs is located closer to the outer periphery than the inner periphery of the insert tube.

13. The combination of claim 9 in which the cross-sectional locus of intersection of the cross legs is located closer to the inner periphery than the outer periphery of the insert tube.

14. A non-pneumatic insert tube for a tire adapted to be mounted upon a circular rim comprising an elongated tube having a thin wall defining a continuous bore of substantially uniform cross-section which extends throughout the entire tube length, a sequence of longitudinally spaced partial cuts severing the thin wall of the tube with each partial cut being generally transverse to the longitudinal axis of the uncoiled tube and with the sequence of partial cuts being generally symmetrically centered about the radial outer periphery of the tube when formed into a single coil hoop for insertion into a tire and with an uncut portion of the tube being generally symmetrically centered about the radial inner periphery of the tube which is to be seated adjacent the rim and with the sequence spacing of the partial cuts being less than the outer diameter of the tube, and a reinforcing web having three relatively thin intersecting cross legs extending across the bore of the tube from sidewall to sidewall and removed from the inner and outer radial peripheries of the coiled tube for the length of the tube and integrally joined to the interior wall of the tube adjacent the partial cuts with the sequence of partial cuts also severing the reinforcing web at least in part.

15. The combination of claim 14 in which the three intersecting cross legs define substantially equal angular cross-sectional sectors.

16. The combination of claim 14 in which the three intersecting cross legs define a first group of equal angular cross-sectional sectors, and a second group of equal angular cross-sectional sectors which are different in size from the first group.

17. A non-pneumatic insert tube for a tire comprising an elongated tube having a thin wall defining a continuous bore of substantially uniform cross-section which extends throughout the entire tube length, a relatively thin reinforcing web disposed within the bore of the tube and integrally attached to the interior sidewalls of the tube to subdivide the tube bore into two sections, and a sequence of spaced partial cuts being disposed about the radial outer periphery of the tube when formed into a single hoop for insertion into a tire with the uncut portion of the tube being located on the radial inner periphery of the tube.

18. The insert tube of claim 17 in which the partial cuts extend into the reinforcing web to subdivide the web into separate sections.

19. The insert tube of claim 17 in which the reinforcing web is located approximately midway between the inside and outside tube peripheries.

20. The insert tube of claim 17 in which the reinforcing web is arched.

21. The insert tube of claim 17 in which the wall portions of the outer periphery are also the approximate thickness as the sidewall portions.

22. A non-pneumatic insert tube for a tire comprising an elongated cylindrical tube having a thin wall defining a continuous bore which extends throughout the entire tube length, a relatively thin reinforcing web disposed within the bore of the tube and integrally attached to the sidewalls of the tube to subdivide the length of the tube bore, the web being curved so as to be longer than the inside diameter of the bore from sidewall to sidewall, and a continuous sequence of spaced partial cuts being symmetrically disposed relative a first longitudinal axis located on the periphery of the uncoiled tube, and with each of the cuts being transverse to the longitudinal central axis of the uncoiled tube.

23. The insert tube of claim 22 in which the web is arched.

24. The insert tube of claim 22 in which the partial cuts extend into the reinforcing web to divide the web into separate sections.

25. A non-pneumatic insert tube in combination with a tire consisting essentially of an elongated tube having a thin wall defining a continuously open and generally circular bore which extends throughout the entire tube length and in which the thickness of the tube wall is substantially less than the radius of the bore, and a sequence of longitudinally spaced, partial cuts transverse to the longitudinal axis of the uncoiled tube extending through and severing the thin wall of the tube with the depth of the partial cuts being greater than the radius of the tube thus severing a major portion of said thin wall with each partial cut being generally C-shaped in cross-sectional configuration with the sequence of partial cuts being disposed about the radial outer periphery of the tube when formed into a single hoop and with an uncut portion of the tube which extends throughout the entire tube length being located on the radial inner periphery of the tube, and in which the longitudinal spacing of the partial cuts is less than the cross-sectional outer diameter of the tube and in which the partial cuts are knifelike cuts in which the tube wall is severed during fabrication.

26. A non-pneumatic insert tube for a tire comprising an elongated tube having a thin wall defining a continuous bore of substantially uniform cross-section which extends at least substantially throughout the entire tube length, at least one relatively thin reinforcing web disposed within the bore of the tube and integrally attached to the interior sidewalls of the tube for at least substantially the entire length of the tube to subdivide the tube bore into at least two sections, and a sequence of spaced partial cuts being disposed about the radial outer periphery of the tube when formed into a single coil hoop for insertion into a tire with the uncut portion of the tube being located on the radial inner perphery of the tube and with each of the partial cuts extending into the reinforcing web to subdivide the at least one relatively thin reinforcing web into separate sections along the longitudinal axis of the uncoiled tube.

27. The insert tube of claim 26 in which the at least one reinforcing web is arched when the web is in an untensioned state, and in which the at least one reinforcing web is flattened when the web is placed in tension due to the forces exerted when the tube is subjected to a load.

28. The insert tube of claim 27 in which the partial cuts are knifelike cuts in which the tube wall and the at least one reinforcing web is severed during fabrication of the tube.

29. A non-pneumatic insert tube for a tire adapted to be mounted upon a circular rim comprising an elongated tube having a thin wall defining a continuous bore which extends for at least substantially the entire tube length, a sequence of longitudinally spaced partial cuts severing the thin wall of the tube with each partial cut being generally transverse to the longitudinal axis of the uncoiled tube and with the cuts being aligned radially on the radial outer periphery of the coiled tube and with the uncut portion of the tube being located on the radial inner periphery of the tube when the insert tube is formed into a single coil hoop for insertion into a tire, and a reinforcing web extending for at least substantially the entire tube length and having a plurality of relatively thin intersecting cross legs extending across the bore of the tube with each cross leg being subdivided at the locus of intersection by a pair of web segments having a generally uniform thickness throughout the length and width of each segment less than the thickness of the thin wall of the tube.

* * * * *